United States Patent [19]

Kawajiri et al.

[11] Patent Number: 5,655,362
[45] Date of Patent: Aug. 12, 1997

[54] EXHAUST EMISSION CONTROL SYSTEM IN ENGINE

[75] Inventors: Shogo Kawajiri; Takuya Sugino; Takahiro Naka; Moriyoshi Awasaka; Kenji Fujiki, all of Saitama, Japan

[73] Assignee: Honda Giken Kogyo Kabushiki Kaisha, Tokyo, Japan

[21] Appl. No.: 310,952

[22] Filed: Sep. 23, 1994

[30] Foreign Application Priority Data

Sep. 24, 1993 [JP] Japan ................................. 5-238310
Sep. 27, 1993 [JP] Japan ................................. 5-262928
Sep. 28, 1993 [JP] Japan ................................. 5-241817

[51] Int. Cl.$^6$ ............................................. F01N 3/28
[52] U.S. Cl. ............................ 60/276; 60/284; 60/285; 60/297
[58] Field of Search ........................... 60/297, 284, 285, 60/276

[56] References Cited

U.S. PATENT DOCUMENTS 5,051,244  9/1991  Dunne ............................ 60/297
5,315,824  5/1994  Takeshima ..................... 60/297
5,410,875  5/1995  Tanaka .......................... 60/297

*Primary Examiner*—Douglas Hart
*Attorney, Agent, or Firm*—Lyon & Lyon LLP

[57] ABSTRACT

Selectively operable first and second exhaust valves are provided for every combustion chamber in an engine. Branch pipes of a first intake manifold are connected to first exhaust ports opened and closed by the first exhaust valves, and branch pipes of a second exhaust manifold are connected to second exhaust ports opened and closed by the second exhaust valves. An adsorbing trap is provided in an aggregated pipe of the first exhaust manifold and a catalytic converter is provided in a common exhaust pipe connected to the aggregated pipes of the first and second exhaust manifolds. Only the first exhaust valves are operated to open and close at a low temperature of the adsorbing trap to permit the exhaust gas to flow into the first exhaust manifold. Thus, hydrocarbons (HCs) in the exhaust gas are adsorbed into the adsorbing trap at the low temperature and the heat of the exhaust gas is effectively utilized to promote the activation of the catalytic converter. As the temperature increases sufficiently to activate the catalytic converter, the HCs adsorbed by the adsorbing trap are desorbed, which restores the HCs adsorbing capability of the adsorbing trap, and the exhaust gases are treated directly by the catalytic converted by operating the second exhaust valves while resting the first exhaust valves.

13 Claims, 16 Drawing Sheets

EXHAUST EMISSION CONTROL SYSTEM IN ENGINE

BACKGROUND OF THE INVENTION

1. Field of the Invention

The present invention relates to an exhaust emission control system of an engine, including a hydrocarbon trap for adsorbing hydrocarbon (HC) at a low temperature, and a catalytic converter capable of being activated at a high temperature, in which the trap and converter are incorporated in an exhaust system of an engine so as to remove hydrocarbon and other harmful components contained in an exhaust gas from the engine.

2. Description of the Prior Art

In a prior art exhaust emission control system of this type, as disclosed in Japanese Patent Application Laid-open No.141816/91, an adsorbing trap and a catalytic converter are incorporated in series in sequence from an upstream side in an exhaust pipe connected to an aggregated pipe of an exhaust manifold. Therefore, this prior art exhaust emission control system suffers from a problem that the exhaust gas is cooled by the exhaust manifold, which has a large heat mass, before the exhaust gas from a combustion chamber reaches the catalytic converter. Therefore, because the catalyst must be hot to function properly, it takes a long time for the catalytic converter to be activated after the start of the engine.

SUMMARY OF THE INVENTION

Accordingly, it is an object of the present invention to provide an exhaust emission control system of the type described above, wherein the catalytic converter can be activated soon after the start of the engine to provide an increased purification rate.

To achieve the above object, according to a first aspect and feature of the present invention, there is provided an exhaust emission control system of an engine including first and second exhaust ports provided in each of the combustion chambers of the engine that open at the inner ends into the combustion chamber, and first and second exhaust valves for independently opening and closing the first and second exhaust ports, said system comprising: a first exhaust manifold having a branch pipe connected to an outer end of the first exhaust port of each of the combustion chambers; a second exhaust manifold having a branch pipe connected to an outer end of the second exhaust port of each of the combustion chambers; the exhaust manifolds having aggregated pipes, respectively, which are connected to a common exhaust pipe; an adsorbing trap incorporated in the aggregated pipe of the first exhaust manifold for adsorbing hydrocarbons at a low temperature; and a catalytic converter incorporated in the exhaust pipe, so that when the adsorbing trap is at a low temperature, the first exhaust valve is operated and the second exhaust valve is rested, thereby permitting an exhaust gas from each of the combustion chambers to flow mainly into the first exhaust manifold.

With the first feature, the diameter at each portion of the first exhaust manifold can be formed small in correspondence to a relatively small flow rate of the exhaust gas when the adsorbing trap is at the low temperature immediately after the start of the engine to make the heat mass small. Therefore, the temperature of the exhaust gas passed through the first exhaust manifold and the adsorbing trap is not lowered substantially, and the catalytic converter can be activated quickly by the heat of the exhaust gas to provide an increased purification rate.

In addition to the first feature, the present invention has a second feature that when the catalytic converter is at a high temperature, the first exhaust valve is rested and the second exhaust valve is operated, thereby permitting the exhaust gas from each of the combustion chambers to flow mainly into the second exhaust manifold.

With the second feature, it is possible to cut off the introduction of the exhaust gas into the catalytic converter at the high temperature thereof without provision of a switch-over valve in the exhaust system to insure a durability of the catalytic converter.

In addition to the first and second features, the present invention further has a third feature that the system further includes a communication pipe provided between the first and second exhaust manifolds to permit the aggregated pipes of the first and second exhaust manifolds to communicate with each other upstream of the adsorbing trap; and a switch-over valve provided between the communication pipe and the first exhaust manifold and switchable between a first position in which it blocks the communication pipe and a second position in which it blocks the aggregated pipe of the first exhaust manifold at a location adjacent an inlet of the adsorbing trap, so that when the adsorbing trap is at a low temperature, the first exhaust valve is operated and the second exhaust valve is rested, and the switch-over valve is shifted to the first position, and when the catalytic converter is at a high temperature, both of the first and second exhaust valves are operated, and the switch-over valve is shifted to the second position.

With the third feature, when the catalytic converter is at the high temperature, it is possible to reduce the back pressure by operation of the first and second exhaust valves thereby providing an increase in power output, and to cut off the introduction of the exhaust gas into the adsorbing trap to insure the durability thereof.

Further, according to a fourth aspect and feature of the present invention, there is provided an exhaust emission control system of an engine, comprising: an adsorbing trap for adsorbing hydrocarbons in an exhaust gas at a low temperature and desorbing the hydrocarbons at a high temperature; a first catalytic converter located downstream from the adsorbing trap and activated at a temperature higher than the temperature at the start of desorption of hydrocarbons by the adsorbing trap; and a second catalytic converter located downstream from the first catalytic converter and also activated at a temperature higher than the temperature at the start of desorption of hydrocarbons by the adsorbing trap, the adsorbing trap and the first and second catalytic converters being incorporated in an exhaust pipe of the engine; a bypass pipe connected to the exhaust pipe to bypass the adsorbing trap and the first catalytic converter, an electric heater provided on the first catalytic converter and capable of heating the first catalytic converter; and a switch-over valve provided between the bypass pipe and the exhaust pipe and shiftable between a first position in which it blocks the bypass pipe and a second position in which it permits the communication of the bypass pipe and closes an inlet of the adsorbing trap, wherein said exhaust emission control system further comprising: a judging means for judging the state of the second catalytic converter to control the electric heater and the switch-over valve, so that when the judging means judges the second catalytic converter to be in an unactivated state, the electric heater is energized and the switch-over valve is retained at the first position, and when the judging means judges the second catalytic converter to be in an activated state, the electric heater is deenergized and the switch-over valve is shifted to the second position.

With the fourth feature, when the second catalytic converter is in the unactivated state, an action of adsorbing hydrocarbons by the adsorbing trap and a subsequent exhaust gas purifying action by an early activation of the first catalytic converter are achieved by blocking the bypass pipe by the switch-over valve and energizing the electric heater of the first catalytic converter, thereby providing an increased exhaust gas purification rate in a low temperature range. When the second catalytic converter is in the activated state, it is possible to prevent both the high temperature deterioration of the adsorbing trap due to the heat of the exhaust gas and the useless consumption of electric power in the electric heater by permitting the communication of the bypass and closing the inlet of the adsorbing trap by the switch-over valve, while at the same time, deenergizing the electric heater.

In addition to the first to fourth features, the present invention has a fifth feature that said adsorbing trap is provided in an intermediate portion of an exhaust passage, and said system further comprises an adsorption period judging means for judging an adsorption period during which the adsorbing trap can adsorb hydrocarbons, and an air-fuel ratio control means for controlling the air-fuel ratio of the air-fuel mixture supplied to the engine to a value leaner than a theoretical air-fuel ratio during a period of adsorption by the adsorbing trap, and controlling the air-fuel ratio to a value richer than the leaner air-fuel ratio after completion of the adsorption period.

With the fifth feature, during the adsorption period during which the adsorbing trap can adsorb hydrocarbons, the air-fuel ratio of the air-fuel mixture supplied to the engine is controlled to the value leaner than the theoretical air-fuel ratio. After the lapse of the adsorption period, the air-fuel ratio is controlled to the theoretical air-fuel ratio or a value richer than the theoretical air-fuel ratio. Therefore, it is possible to prevent the, hydrocarbon adsorbing capability of the adsorbing trap from being reduced due to an increase in the amount of hydrocarbons discharge during the adsorption period. As a result, it is possible to insure that a required amount of hydrocarbons be adsorbed without increasing the capacity of the adsorbing trap.

The above and other objects, features and advantages of the invention will become apparent from the following description of preferred embodiments taken in conjunction with the accompanying drawings.

DESCRIPTION OF THE PREFERRED EMBODIMENTS

The present invention will now be described by way of preferred embodiments in connection with the accompanying drawings.

A first embodiment shown in FIGS. 1 to 7 will be described first.

Figure 1:
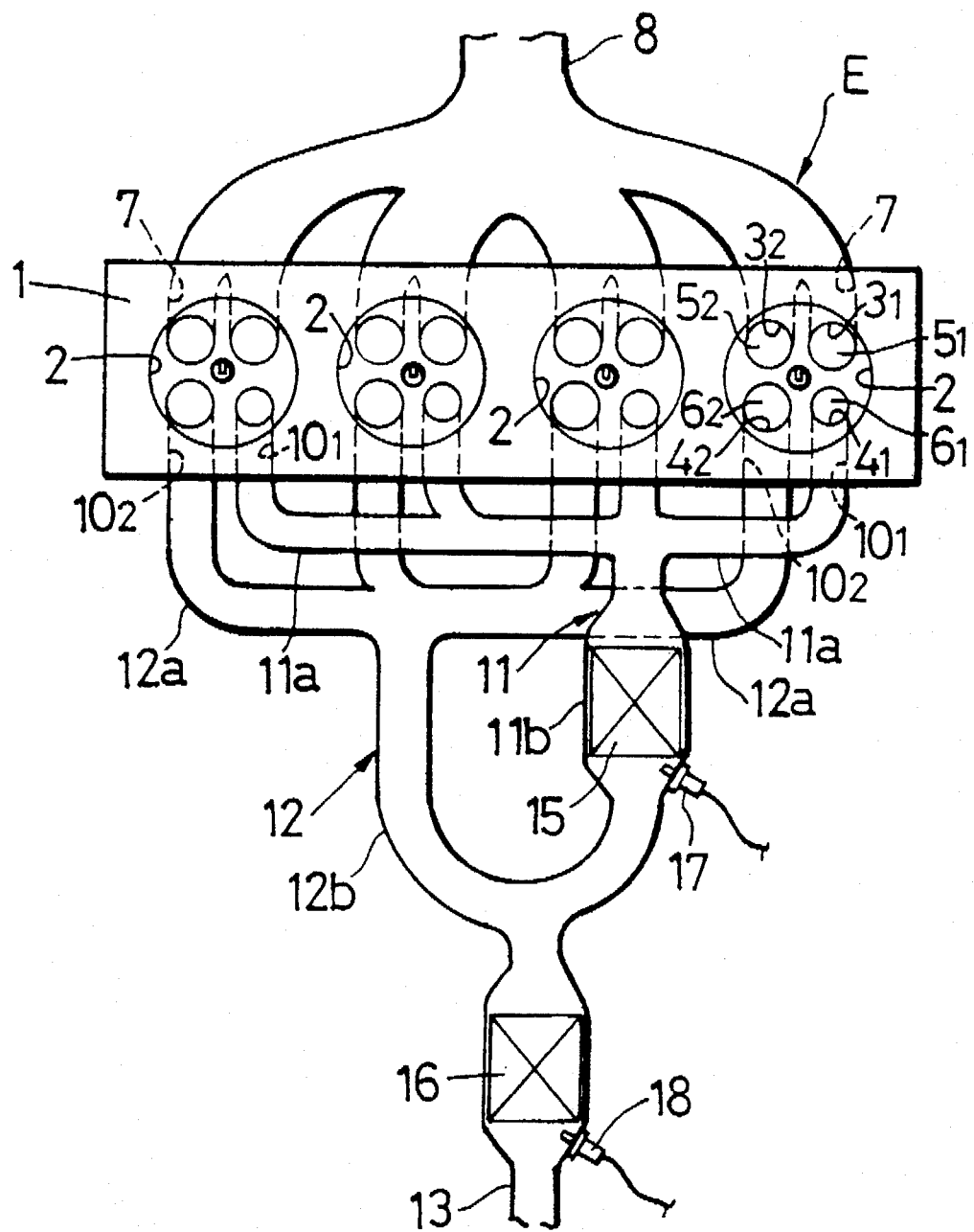
FIG. 1 is a bottom view illustrating a cylinder head and the intake and exhaust systems of an engine according to a first embodiment of the present invention.

FIG. 1 is a bottom view of a cylinder head and the intake and exhaust systems of a multi-cylinder engine E for a vehicle. Referring to FIG. 1, the cylinder head 1 includes a plurality of combustion chambers 2, 2 . . . corresponding to a plurality of cylinders. A pair of intake valve bores $3_1$ and $3_2$ and a pair of exhaust valve bores $4_1$ and $4_2$ are opened into a ceiling surface of each of the combustion chambers 2. And a pair of intake valves $5_1$ and $5_2$ and a pair of exhaust valves $6_1$ and $6_2$ are provided in the cylinder head 1 to open and close the intake valve bores $3_1$ and $3_2$ and the exhaust valve bores $4_1$ and $4_2$, respectively. Preferably, one of the exhaust valve bores $4_1$ and $4_2$ and one of the exhaust valves $6_1$ and $6_2$ are formed smaller in diameters than the others. Here, the smaller ones are called the first exhaust valve bore $4_1$ and exhaust valve $6_1$, respectively, and the larger ones are called the second exhaust valve bore $4_2$ and second exhaust valve $6_2$, respectively.

An intake port 7 having a bifurcated branch connected to the intake valve bores $3_1$ and $3_2$ of each of the combustion chambers 2 is connected to a branch pipe of an intake manifold 8 at one side surface of the cylinder head 1.

A first exhaust port $10_1$ connected to the first exhaust valve bore $4_1$ in each of the combustion chambers 2 is connected to a branch pipe 11a of a first exhaust manifold 11 on the other side of the cylinder head 1, and a second exhaust port $10_2$ connected to the second exhaust valve bore $4_2$ is likewise connected to a branch pipe 12a of a second manifold 12 on that other side of the cylinder head 1.

Each of the first and second exhaust manifolds 11 and 12 includes a single aggregated pipe 11b, 12b, respectively. These aggregated pipes 11b and 12b are connected to a single common exhaust pipe 13 to join each other at their downstream ends.

The collection pipe 11b of the first exhaust manifold 11 is provided with an adsorbing trap 15 having a hydrocarbon (HC) adsorbent accommodated therein, and a first temperature sensor 17 for detecting the temperature at an outlet of the adsorbing trap 15. A catalytic converter 16 and a second temperature sensor 17 for detecting the temperature at an outlet of the catalytic converter 16 are mounted at an upstream end of the exhaust pipe 13. The adsorbing trap 15 has the capability to adsorb hydrocarbons at a lower temperature than a predetermined temperature (e.g., 140° C.) and to desorb the hydrocarbons at a higher temperature than the predetermined temperature. The catalytic converter 16 includes a noble metal catalyst which is activated at a predetermined temperature (e.g., 300° C.) or more to convert and remove hydrocarbons (HCs), carbon monoxide (CO) and nitrogen oxides (NOx).

An exhaust valve operating device for opening and closing the first and second exhaust valves $6_1$ and $6_2$ will be described below in connection with FIGS. 2 to 7.

Figure 2:
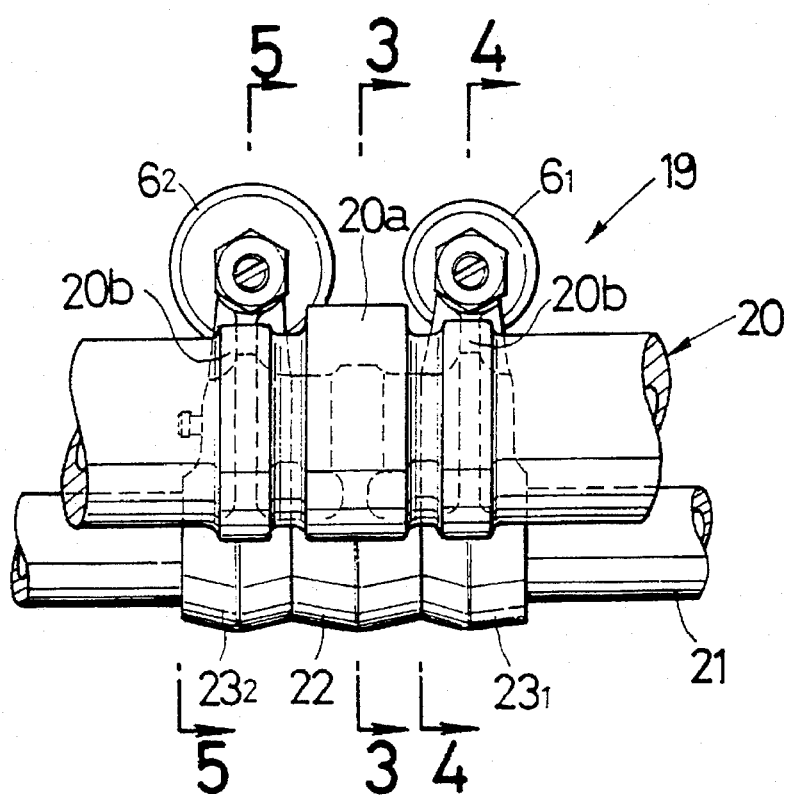
FIG. 2 is a plan view of an exhaust valve operating device in the engine.
Figure 3:
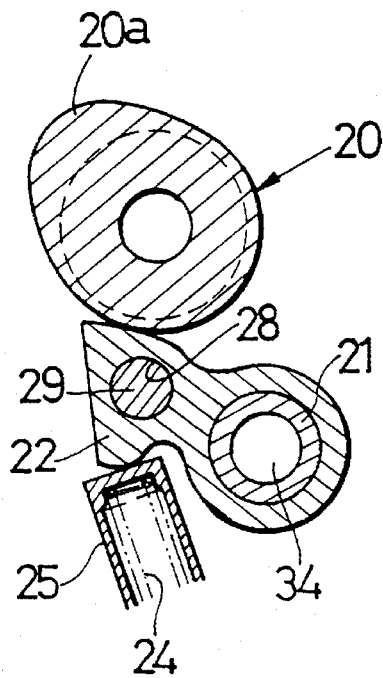
FIG. 3 is a sectional view taken along a line 3—3 in FIG. 2.

Referring to FIG. 2, the exhaust valve operating device 19 includes a cam shaft 20 driven at a rotation rate of ½ of the rate of rotation of the crankshaft which is not shown, a rocker shaft 21 parallel to the cam shaft 20, a single driving rocker arm 22 and a pair of first and second follower rocker arms $23_1$ and $23_2$, all of which rocker arms are pivotally carried on the rocker shaft 21 for each combustion chamber 2. The cam shaft 20 is integrally formed with a normal operating cam 20a provided to be in sliding contact with an upper surface of the driving rocker arm 22, and first and second circular resting cams 20b, 20b provided to be in sliding contact with upper surfaces of the first and second follower rocker arms $23_1$ and $23_2$, respectively. As shown in FIG. 3, the driving rocker arm 22 is biased in a direction to abut against the operating cam 20a by a spring 24 through a guide piston 25.

Figure 4:
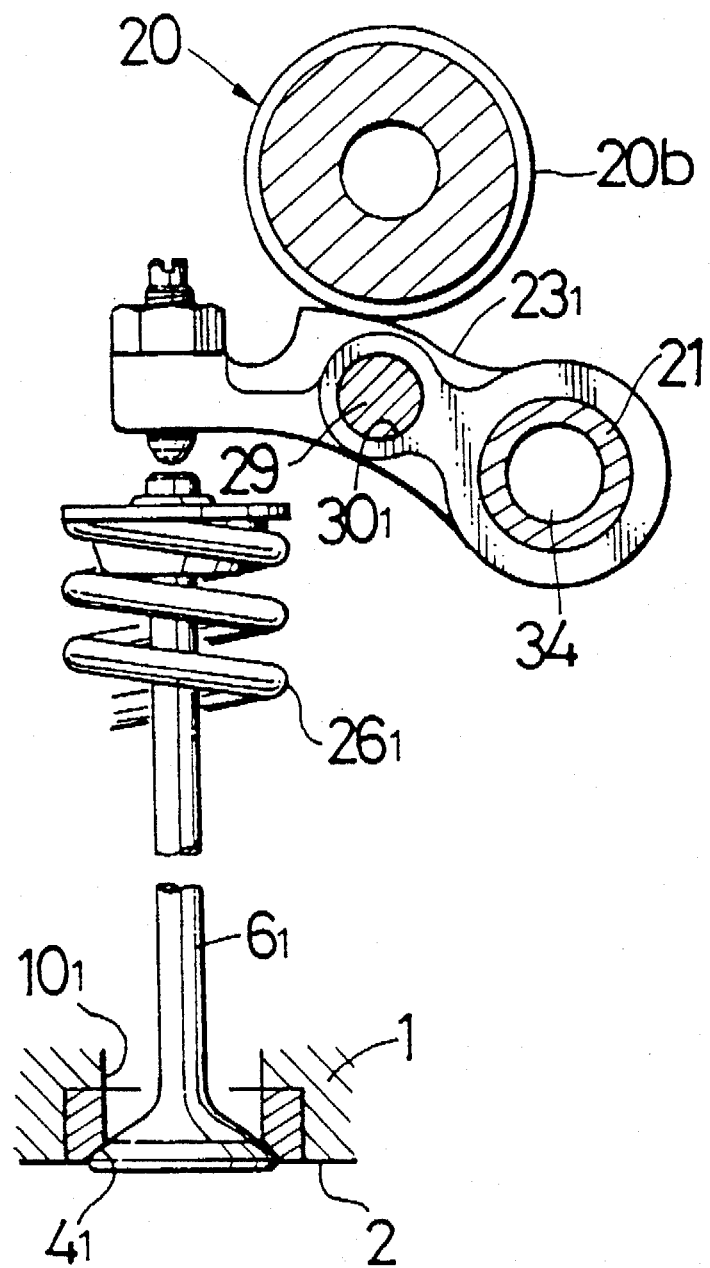
FIG. 4 is a sectional view taken along a line 4—4 in FIG. 2.
Figure 5:
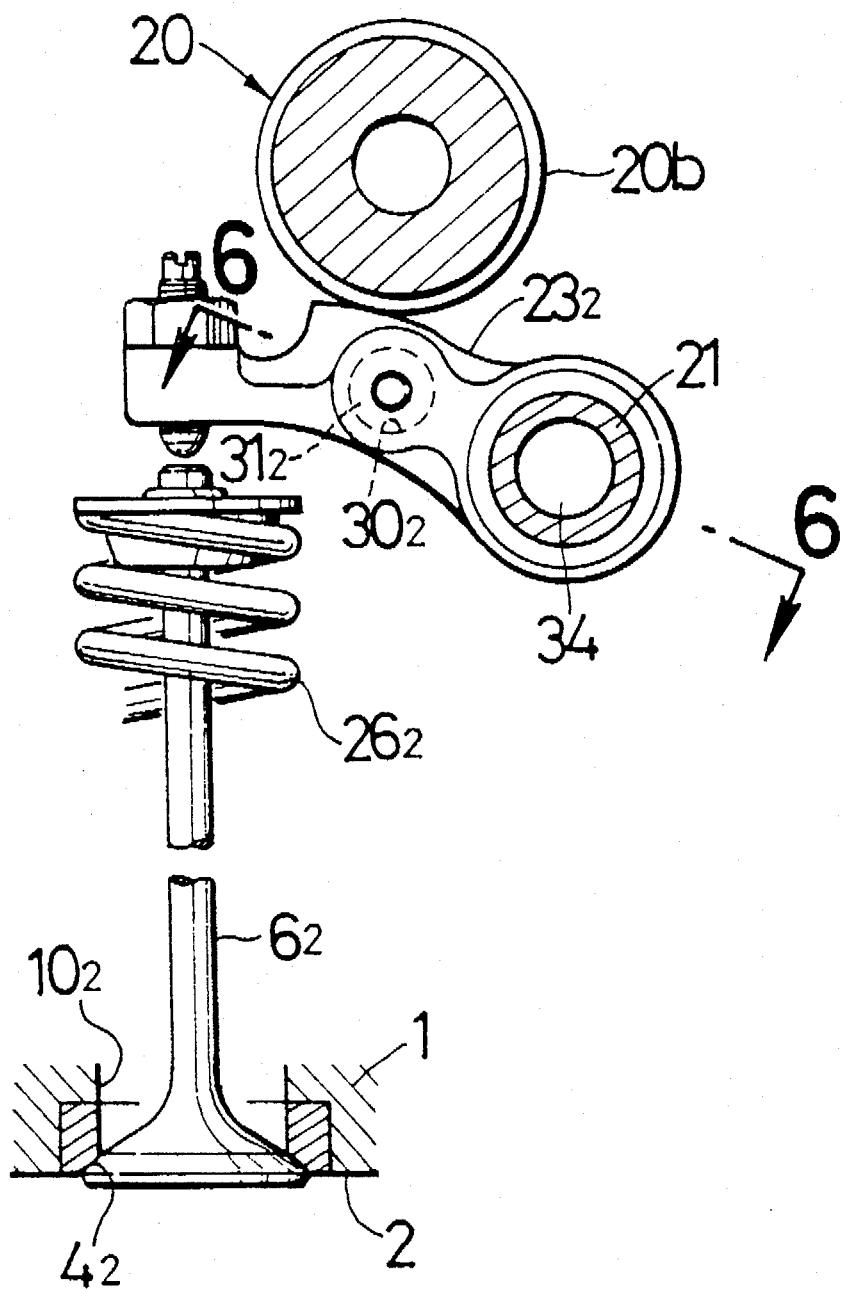
FIG. 5 is a sectional view taken along a line 5—5 in FIG. 2.

As shown in FIGS. 4 and 5, the first and second follower rocker arms $23_1$ and $23_2$ are disposed such that they can urge, by their tip ends, the heads of the first and second exhaust valves $6_1$ and $6_2$ which are biased in closing directions by valve springs $26_1$ and $26_2$, respectively.

Figure 6:
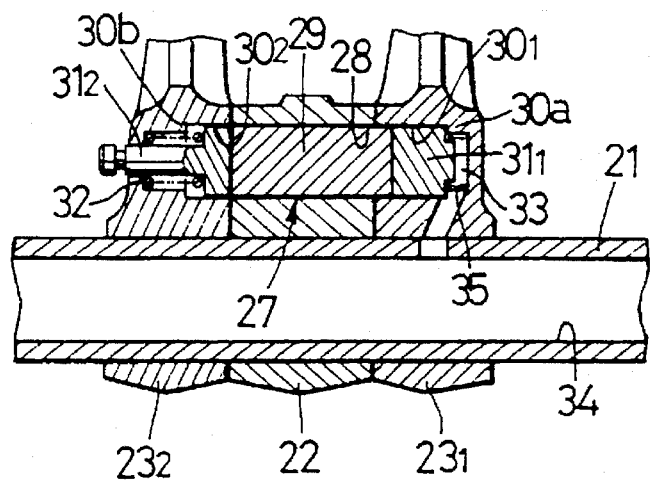
FIG. 6 is a sectional view taken along a line 6—6 in FIG. 5.

As shown in FIG. 6, the driving rocker arm 22 and the first and second follower rocker arms $23_1$ and $23_2$ are disposed in an adjoining relation to one another, so that the driving rocker arm 22 is sandwiched between the follower rocker arms $23_1$ and $23_2$. A connecting device 27 is provided in these rocker arms and is capable of being alternately switched between a state in which it connects the driving rocker arm 22 to the first follower rocker arm $23_1$ and a state in which it connects the driving rocker arm 22 to the second follower rocker arm $23_2$.

The connecting device 27 includes a connecting pin 29 slidably fitted in a central guide hole 28 which is provided in the driving rocker arm 22 in parallel to the rocker shaft 21 and opened at opposite ends thereof, a first piston $31_1$ slidably received in a first bottomed side guide hole $30_1$ which is provided in the first follower rocker arm $23_1$ and alignable with one end of the central guide hole 28, and a second piston $31_2$ received in a second bottomed side guide hole $30_2$ which is provided in the second follower rocker arm $23_2$ and alignable with the other end of the central guide hole 28. The connecting pin 29 is longer than the central guide hole 28 and movable between a first connecting position (FIG. 6) in which its one end is inserted into the first side guide hole $30_1$ from the central guide hole 28 to connect the driving rocker arm 22 to the first follower rocker arm $23_1$, and a second connecting position (FIG. 7) in which the other end thereof is inserted into the second side guide hole $30_2$ from the central guide hole 28 to connect the driving rocker arm 22 to the second follower rocker arm $23_2$.

The first connecting position is defined by the abutment of the first piston $31_1$ against a step 30a of the first side guide hole $30_1$, and the second connecting position is defined by the abutment of the second piston $31_2$ against a step 30b of the second side guide hole $30_2$.

A return spring 32 is mounted under compression in the second side guide hole $30_2$ for biasing the connecting pin 29 toward the first connecting position through the second piston $31_2$. A hydraulic pressure chamber 33 is defined in the first side guide hole $30_1$ and is faced by an outer end of the first piston $31_1$. The hydraulic pressure chamber 33 is selectively connected to a hydraulic pressure source or an oil reservoir through an oil passage 34 in the rocker shaft 21 by a control valve which is not shown. A vibration-isolating spring 35 is mounted in the hydraulic pressure chamber 33 and has a force weaker than that of the return spring 32.

As shown in FIG. 6, if the hydraulic pressure chamber 33 is emptied by being opened into the oil reservoir, the connecting pin 29 is moved to the first connecting position by the resilient force of the return spring 32 to connect the driving rocker arm 22 to the first follower rocker arm $23_1$ and to free the second follower rocker arm $23_2$. In such a condition, if the cam shaft 20 is being rotated, the operating cam 20a allows the driving rocker arm 22 to be vertically swung by cooperation with the valve spring $26_1$, so that the first follower rocker arm $23_1$ connected to the driving rocker arm 22 is also swung to open and close the first exhaust valve $6_1$, but the second follower rocker arm $23_2$ in its free state is brought into sliding contact with the corresponding resting cam 20b, so that the second exhaust valve $6_2$ is rested in its closed state.

Figure 7:
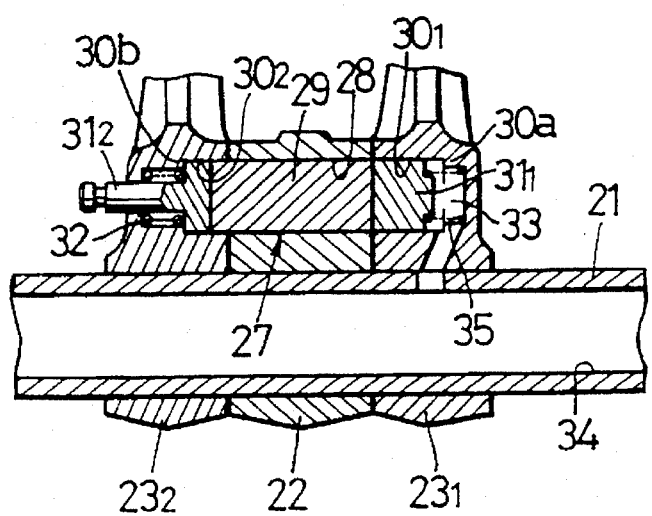
FIG. 7 is a sectional view similar to FIG. 6, but showing a connecting pin as being in an operated state.

If a hydraulic pressure is supplied to the hydraulic pressure chamber 33 as shown in FIG. 7, the first piston $31_1$ receives such hydraulic pressure to move the connecting pin 29 to the second connecting position, thereby connecting the driving rocker arm 22 to the second follower rocker arm $23_2$, while freeing the first follower rocker arm $23_1$. If the cam shaft 20 is being rotated in this condition, the operating cam 20a causes the driving rocker arm 22 and the second follower rocker arm $23_2$ to be swung by cooperation with the valve spring $26_2$, thereby opening or closing the second exhaust valve 62, but the first follower rocker arm $23_1$ in its free state is brought into sliding contact with the corresponding resting cam 20b, so that the first exhaust valve $6_1$ is rested in its closed state.

The operating and resting conditions for the first and second exhaust valves $6_1$ and $6_2$ are established according to the following Table 1.

TABLE 1

| $T_1$ | <140° C. | | ≧140° C. | |
|---|---|---|---|---|
| $T_2$ | | | <300° C. | ≧300° C. |
| Load on engine | | small | large | |

TABLE 1-continued

| State of first exhaust valve | operated | operated | rested | rested |
|---|---|---|---|---|
| State of second exhaust valve | rested | rested | operated | operated |

$T_1$ — temperature at the outlet of the adsorbing trap 15, as detected by the first temperature sensor 17;
$T_2$ — temperature at the outlet of the catalytic converter 16, as detected by the second temperature sensor 18;

$T_1$—temperature at the outlet of the adsorbing trap 15, as detected by the first temperature sensor 17;

$T_2$—temperature at the outlet of the catalytic converter 16, as detected by the second temperature sensor 18; Load on engine:

The operation of the first embodiment now will be described.

If $T_1$ is lower than 140° C. during operation of the engine, the first exhaust valve $6_1$ is in an operated state and the second exhaust valve $6_2$ is in the rested state, irrespective of the magnitude of load. Therefore, the exhaust gas from each combustion chamber 2 is discharged into the first exhaust port $10_1$, collected into the first exhaust manifold 11, and introduced into the adsorbing trap 15, so that hydrocarbons in the exhaust gas are adsorbed by the hydrocarbon (HC) adsorbent in the adsorbing trap 15. The exhaust gas with the hydrocarbons removed therefrom in this manner is then passed to the exhaust pipe 13 and through the catalytic converter 16 while heating it.

When the adsorbing trap 15 is heated by the heat of the exhaust gas until $T_1$ exceeds 140° C., the hydrocarbons are desorbed from the adsorbent in the adsorbing trap 15. In this case, if the load of the engine is small, the operated state of the first exhaust valve $6_1$ and the rested state of the second exhaust valve $6_2$ are not varied and hence, the hydrocarbons desorbed from the adsorbing trap 15 are introduced along with the exhaust gas discharged from the first exhaust port $10_1$ into the catalytic converter 16, where it is converted. In this manner, the hydrocarbon adsorbent in the adsorbing trap 15 is regenerated.

On the other hand, if the load on the engine is large, the first exhaust valve $6_1$ is switched to the rested state, and the second exhaust valve $6_2$ is switched to the operated state, even though the temperature $T_2$ at the outlet of the catalytic converter 16 is less than 300° C. and not completely activated. Thus, the exhaust gas from the combustion chamber 2 is collected into the second exhaust manifold 12 from the second exhaust ports $10_2$ and introduced into the catalytic converter 16. When the load on the engine is large, the exhaust gas is at a relatively high temperature and in a large volume and hence, it effectively heats the catalytic converter 16 to contribute to the activation thereof. As a result, hydrocarbons (HCs), carbon monoxide (CO) and nitrogen oxides (NOx) are effectively converted and removed, and the durability of the adsorbing trap 15 is insured because the exhaust gases do not pass through the adsorbing trap 15.

If $T_2$ is increased to 300° C. or more, the catalytic converter 16 is completely activated. In this case, the first exhaust valve $6_1$ is retained at the rested state, while the second exhaust valve $6_2$ is retained at the operated state, irrespective of the magnitude of the load on the engine. Therefore, the exhaust gas from the combustion chamber 2 is collected into the second exhaust manifold 12 from the second exhaust ports $10_2$ and purified by the catalytic converter 16 in the exhaust pipe 13. Moreover, because the second exhaust valve $6_2$ is larger in diameter than the first exhaust valve $6_1$, an increase in back pressure can be suppressed even if the flow rate of the exhaust gas is increased, leading to an increase in power output from the engine. Further, the exhaust gas is not introduced into the adsorbing trap 15 and therefore, an excessive increase in the temperature thereof is avoided, and the durability thereof can be maintained.

The first exhaust manifold 11 may be formed with a small diameter at each portion in correspondence to the relatively small flow rate of the exhaust gas at the time when the adsorbing trap 15 is at a low temperature. Thus, it is possible to reduce the heat mass of the first exhaust manifold 11 minimize the reduction in the temperature of the exhaust gas and to provide an early activation of the catalytic converter 16.

In the first embodiment, as an alternative the operating and resting conditions for the first and second exhaust valves $6_1$ and $6_2$ can be established as given in the following Table 2, wherein the portions that are different from Table 1 are indicated by *.

TABLE 2

| $T_1$ | <140° C. | | ≧140° C. | |
|---|---|---|---|---|
| $T_2$ | | <300° C. | ≧300° C. | |
| Load on engine | | * | small | large |
| State of first exhaust valve | operated | *rested | *operated | *operated (or rested) |
| State of second exhaust valve | rested | *operated | operated | operated |

If the first exhaust valve $6_1$ is brought into the rested state and the second exhaust valve $6_2$ is brought into the operated state irrespective of the magnitude of the load of the engine when the $T_1$ is equal to or higher than 140° C. and $T_2$ is lower than 300° C., hydrocarbons can be preserved in the adsorbing trap 15, until the catalytic converter 16 is completely activated.

In the use of an exhaust emission control device including an exhaust gas purifying mechanism with a metal catalyst added to the adsorbing trap 15, when $T_1$ is equal to or higher than 140° C., $T_2$ is equal to or higher than 300° C. and the load of the engine is small, the connecting pin 29 is retained at an intermediate position to keep both of the first and second exhaust valves $6_1$ and $6_2$ at their operated states. By doing so, the exhaust gas discharged from the first exhaust ports $10_1$ is purified within the first exhaust manifold 11 and therefore, the burden of the catalytic converter 16 disposed downstream can be reduced.

A second embodiment of the present invention will now be described in connection with FIGS. 8 to 12.

Figure 8:
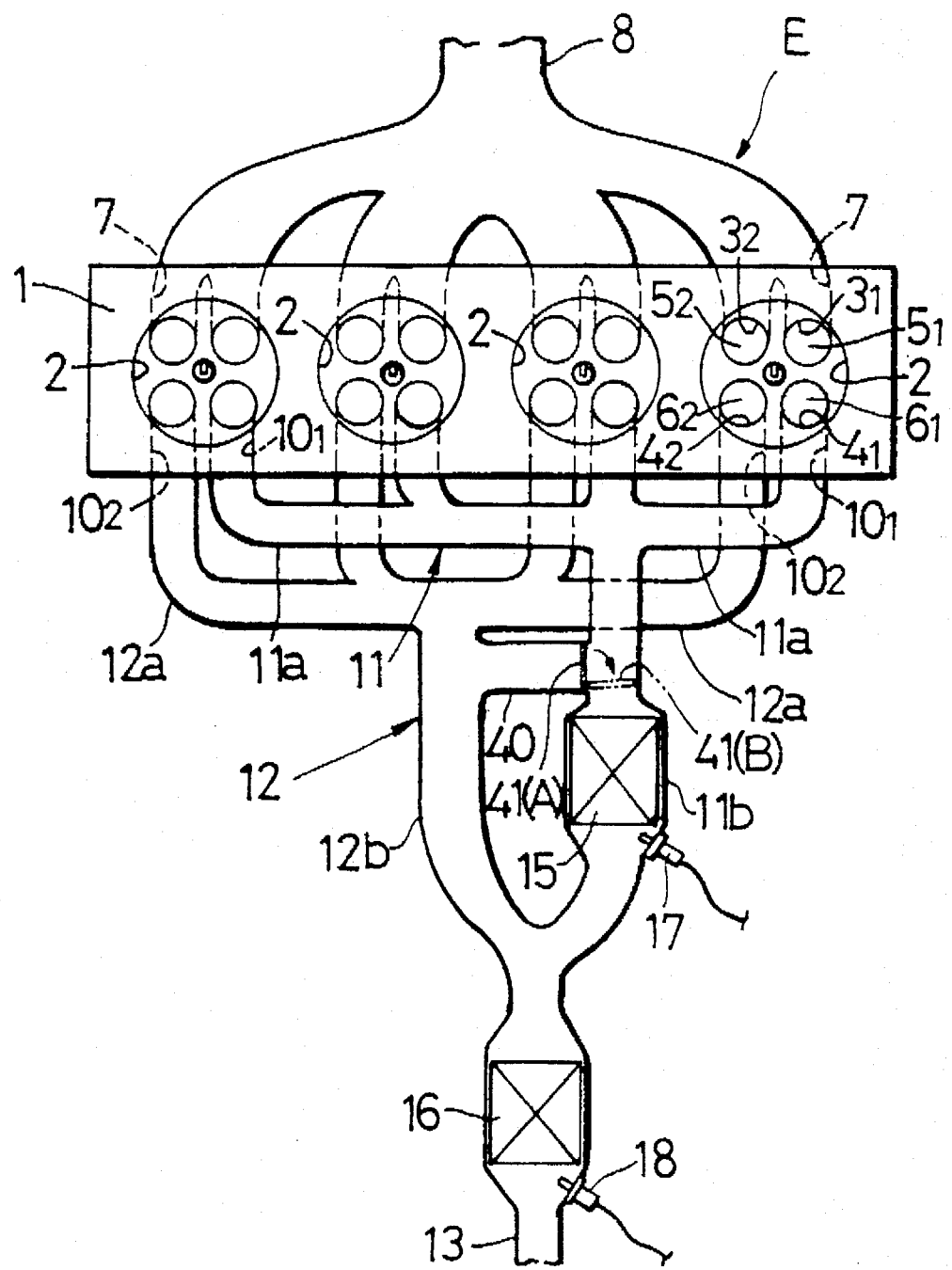
FIG. 8 is a bottom view illustrating a cylinder head and the intake and exhaust systems of an engine according to a second embodiment of the present invention.

Referring to FIG. 8, respective aggregated pipes 11b and 12b of the first and second exhaust manifolds 11 and 12 are interconnected through a communication pipe 40 at a location upstream of the adsorbing trap 15. A switch-over valve 41 is provided between the communication pipe 40 and the first exhaust manifold 11 and is turnable between a first position "A", see 41(A), in which it blocks the communication pipe 40 and a second position "B", see 41(B), in which it blocks the aggregated pipe 11b at the inlet of the adsorbing trap 15. The first and second exhaust valve bores $4_1$ and $4_2$ are formed of the same diameter. The same is true of the first and second exhaust valves $6_1$ and $6_2$. An exhaust valve operating device for the first and second exhaust valves $6_1$ and $6_2$ now will be described with reference to FIGS. 9 to 12.

Figure 9:
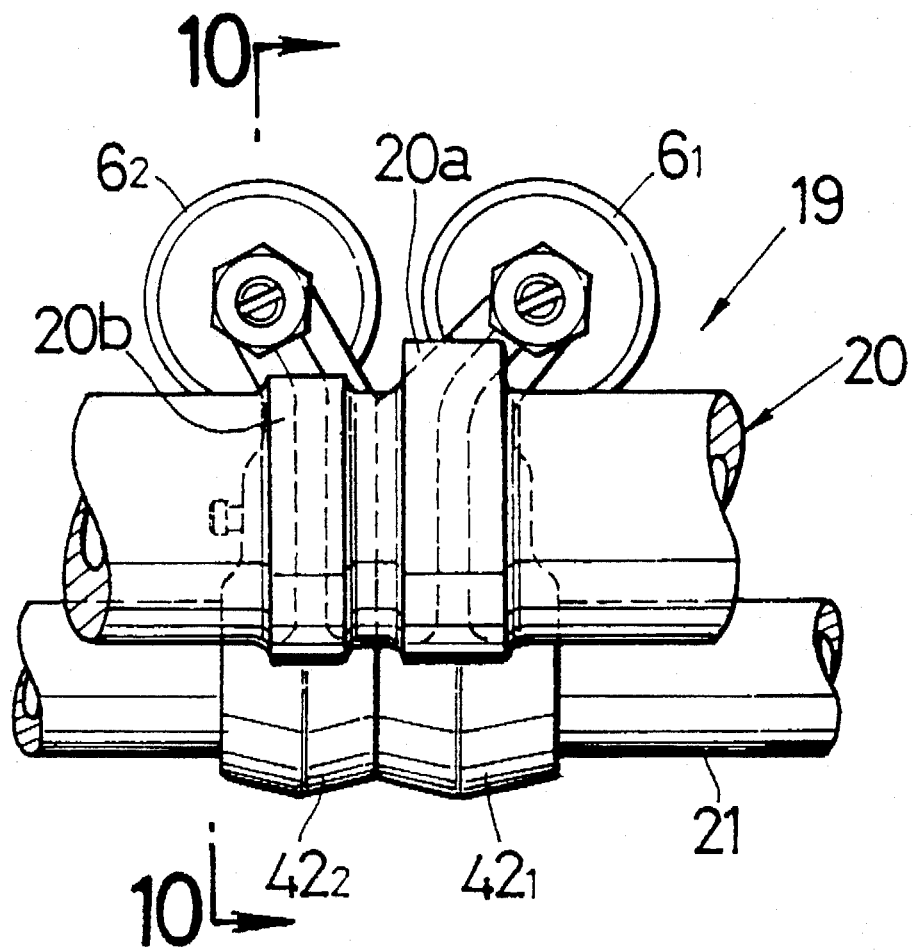
FIG. 9 is a plan view of an exhaust valve operating device in the engine.
Figure 10:
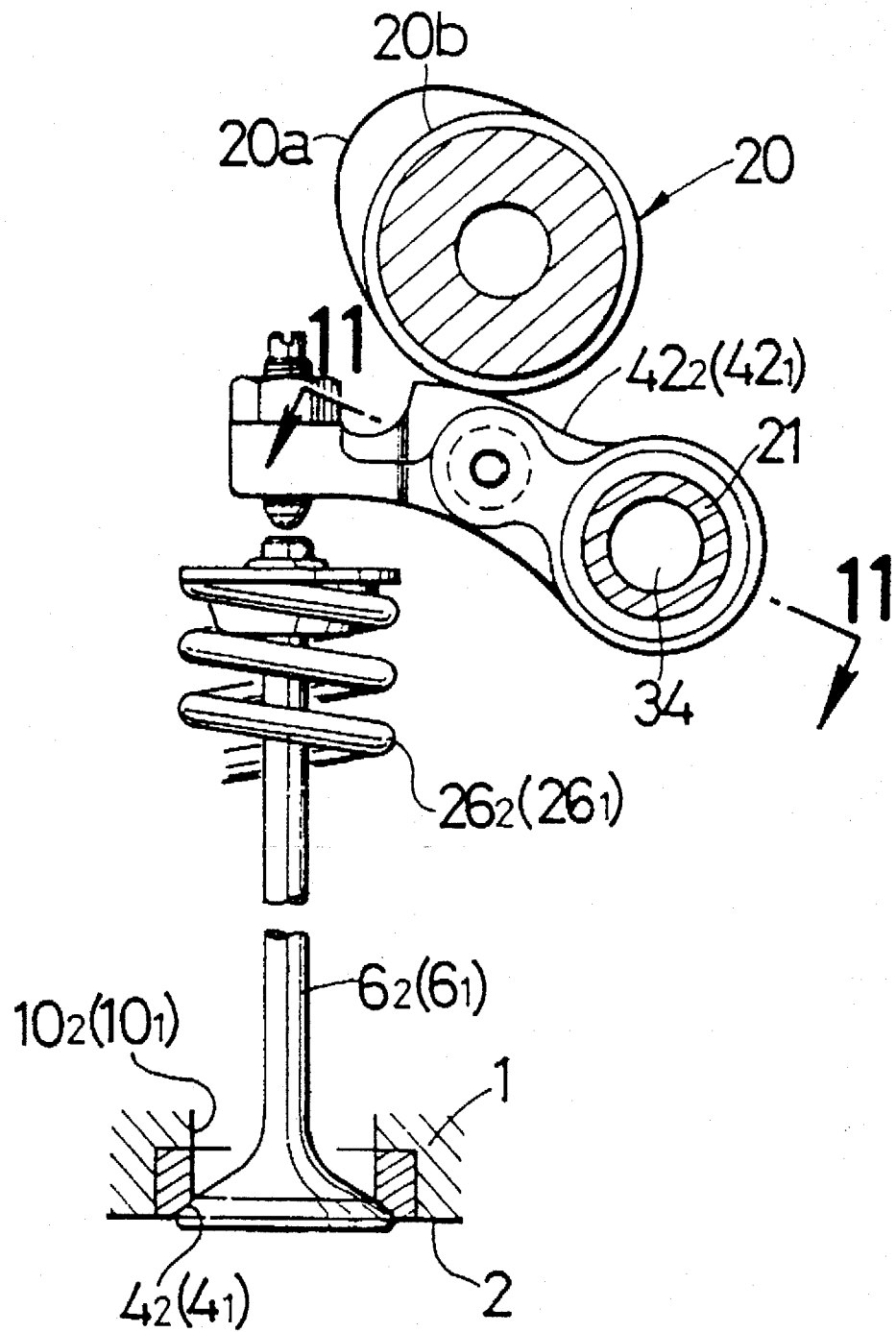
FIG. 10 is a sectional view taken along a line 10—10 in FIG. 9.

Referring to FIGS. 9 and 10, a single operating cam 20a and a single resting cam 20b are formed on a cam shaft 20 of the exhaust valve operating device 19 for every combustion chamber 2. First and second rocker arms $42_1$ and $42_2$ are pivotally carried in an adjoining relation to each other on a rocker shaft 21 with their tip ends abutting against the heads of the first and second exhaust valves $6_1$ and $6_2$, so that the operating cam 20a and the resting cam 20b are brought into sliding contact with upper surfaces of the first and second rocker arms $42_1$ and $42_2$, respectively.

A connecting device 43 is mounted on the rocker arms $42_1$ and $42_2$ for connecting and disconnecting them to and from each other.

The connecting device 43 includes a connecting pin 45 slidably fitted into a first guide hole $44_1$ in the first rocker arm $42_1$, and a piston 46 slidably received in a second guide hole $44_2$ in the second rocker arm $42_2$. The connecting pin 45 is movable between a non-connecting position (FIG. 11) in which one end face thereof is matched to a boundary plane between the adjoining guide holes $44_1$ and $44_2$, and a connecting position (FIG. 12) in which the one end face thereof is inserted into the second guide hole $44_2$. The non-connecting position is defined by abutment of an end of the connecting pin 45 against a step 44a of the first guide hole $44_1$, and the connecting position is defined by abutment of the piston 46 abutting against a step 44b of the second guide hole $44_2$.

A return spring 47 is compressed in the second guide hole $44_2$ for biasing the connecting pin 45 through the piston 46 toward the non-connecting position. A hydraulic pressure chamber 48 is defined in the second guide hole $44_2$ and faced by the end face of the connecting pin 45. The hydraulic pressure chamber 48 is selectively connected to a hydraulic pressure source or an oil reservoir through an oil passage 34 within the rocker shaft 21 by a control valve which is not shown. An vibration-isolating spring 49 is also mounted in the hydraulic pressure chamber 48 and has a force weaker than that of the return spring 47.

Figure 11:
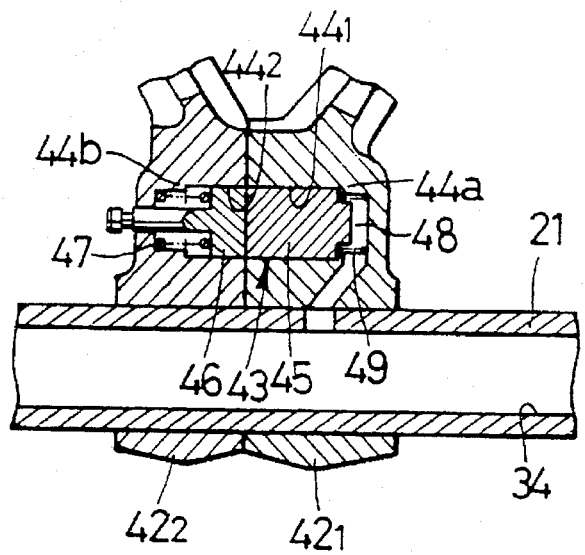
FIG. 11 is a sectional view taken along a line 11—11 in FIG. 10.

Thus, if the hydraulic pressure chamber 48 is opened into the oil reservoir, as shown in FIG. 11, the connecting pin 45 is moved to the non-connecting position by the resilient force of the return spring 47 to bring the rocker arms $42_1$ and $42_2$ into their independent states. If the cam shaft 20 is being rotated in such condition, the first rocker arm $42_1$ is swung vertically by cooperation of the operating cam 20a with the valve spring $26_1$ to open or close the first exhaust valve $6_1$, but the second rocker arm $42_2$ is in sliding contact with the resting cam 20b and not swung, so that it permits the second exhaust valve $6_2$ to be at rest in its closed state.

Figure 12:
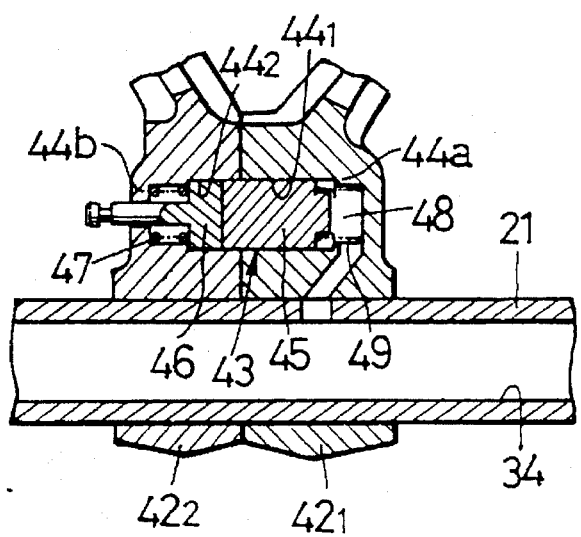
FIG. 12 is a sectional view similar to FIG. 11, but showing a connecting pin as being in an operated state.

If a hydraulic pressure is supplied to the hydraulic pressure chamber 48, as shown in FIG. 12, the connecting pin 45 is moved to the connecting position by reception of such hydraulic pressure, thereby interconnecting the rocker arms $42_1$ and $42_2$. If the cam shaft is being rotated in such condition, the rocker arms $42_1$ and $42_2$ are simultaneously swung vertically by cooperation of the operating cam 20a with the valve springs $26_1$ and $26_2$ to open or close the exhaust valves $6_1$ and $6_2$.

Operating and resting conditions for the first and second exhaust valves $6_1$ and $6_2$ and a switching condition for the switch-over valve 41 are established according to the following table 3.

TABLE 3

| $T_1$ | <140° C. | ≧140° C. | | |
|---|---|---|---|---|
| $T_2$ | | <300° C. | | ≧300° C. |
| Load of engine | | small | large | |
| State of first exhaust valve | operated | operated | operated | operated |
| State of second exhaust valve | rested | rested | operated | operated |
| Position of switch-over valve | A | A | B | B |

A — Position of the switch-over valve 41 which blocks the communication pipe 40; and
B — Position of the switch-over valve 41 which blocks the aggregated pipe 11b of the first exhaust manifold 11 at the inlet of the adsorbing trap 15.

Other structures are the same as those in the first embodiment, and the similar elements are indicated by the same reference numerals as those in the first embodiment.

According to the second embodiment, an affect similar to that in the first embodiment can be obtained and in addition, when the load of the engine is large, it is possible to reduce the back pressure and increase power output by simultaneous operation of the first and second exhaust valves $6_1$ and $6_2$.

In the second embodiment, as an alternative the operating and resting conditions for the first and second exhaust valves $6_1$ and $6_2$ and the switching condition for the switch-over valve 41 can be established as given in the following Table 4, wherein the points that are different from Table 1 are indicated by *.

TABLE 4

| $T_1$ | <140° C. | ≧140° C. | | | |
|---|---|---|---|---|---|
| $T_2$ | | <300° C. | | ≧300° C. | |
| Load on engine | | small | large | small | large |
| State of first exhaust valve | operated | operated | operated | operated | operated |
| State of second exhaust valve | rested | rested | operated | operated | operated |
| Position of switch-over valve | A | *B | B | *A | B |

If the switch-over valve 41 is shifted to the second position B while maintaining the operated state of the first exhaust valve $6_1$ and the rested state of the second exhaust valve $6_2$, when $T_1$ is equal to or higher than 140° C., $T_2$ is lower than 300° C. and the load of the engine is small, hydrocarbons can be preserved in the adsorbing trap 15 until the catalytic converter 16 is completely activated.

In the use of an exhaust emission control device including an exhaust gas purifying mechanism with a metal catalyst added to the adsorbing trap 15, when $T_1$ is equal to or higher than 140° C., $T_2$ is equal to or higher than 300° C. and the load of the engine is small, the switch-over valve 41 is returned to the first position A, while maintaining the exhaust valve $6_1$ and $6_2$ at the operated states. By doing so, the exhaust gas discharged from the first exhaust port $10_1$ is purified within the first exhaust manifold 11 and therefore, the burden of the catalytic converter 16 disposed downstream can be reduced.

Figure 13:
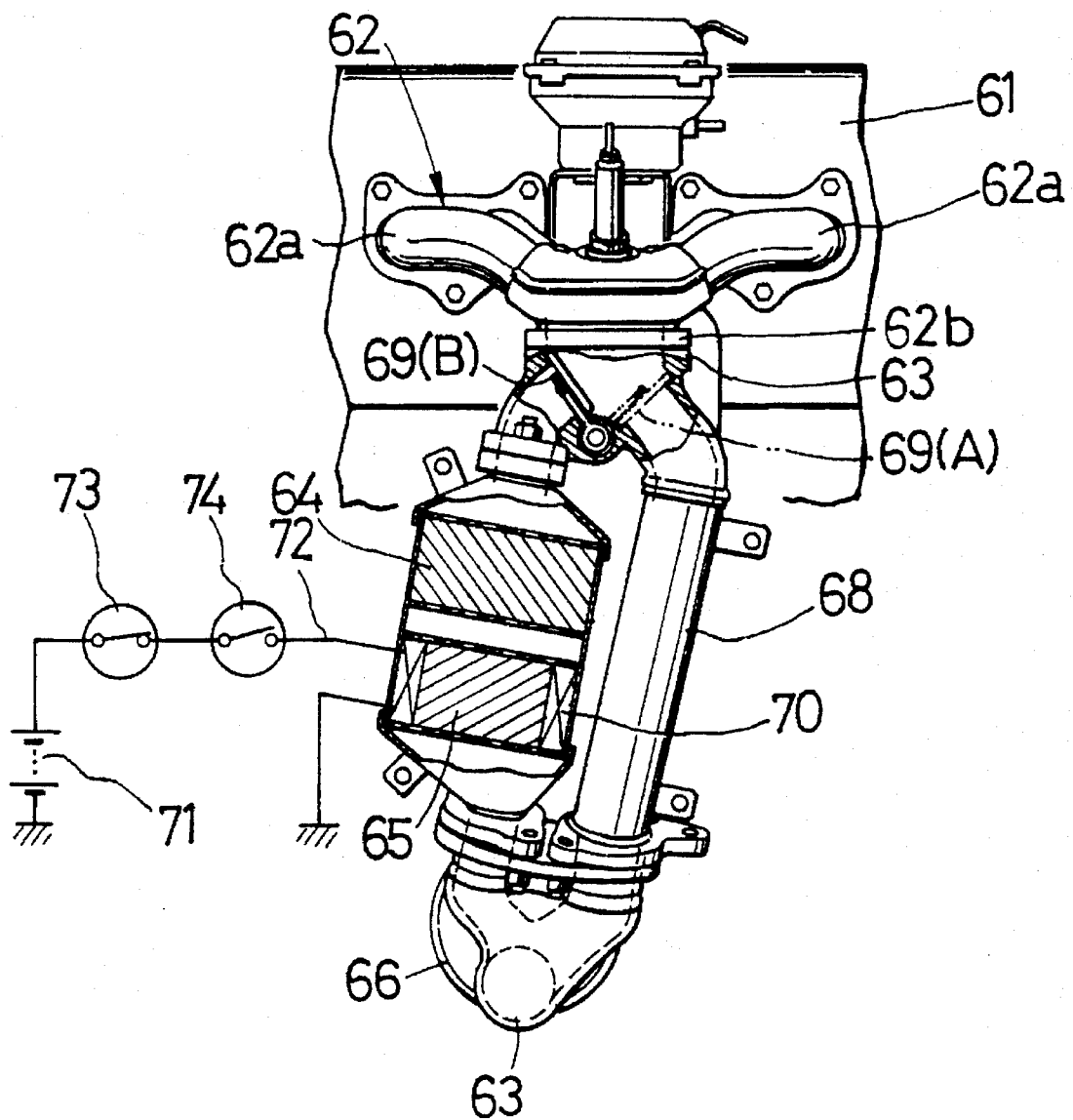
FIG. 13 is a vertical sectional front view of an essential portion of an exhaust emission control system of an engine for a vehicle according to a third embodiment of the present invention.
Figure 14:
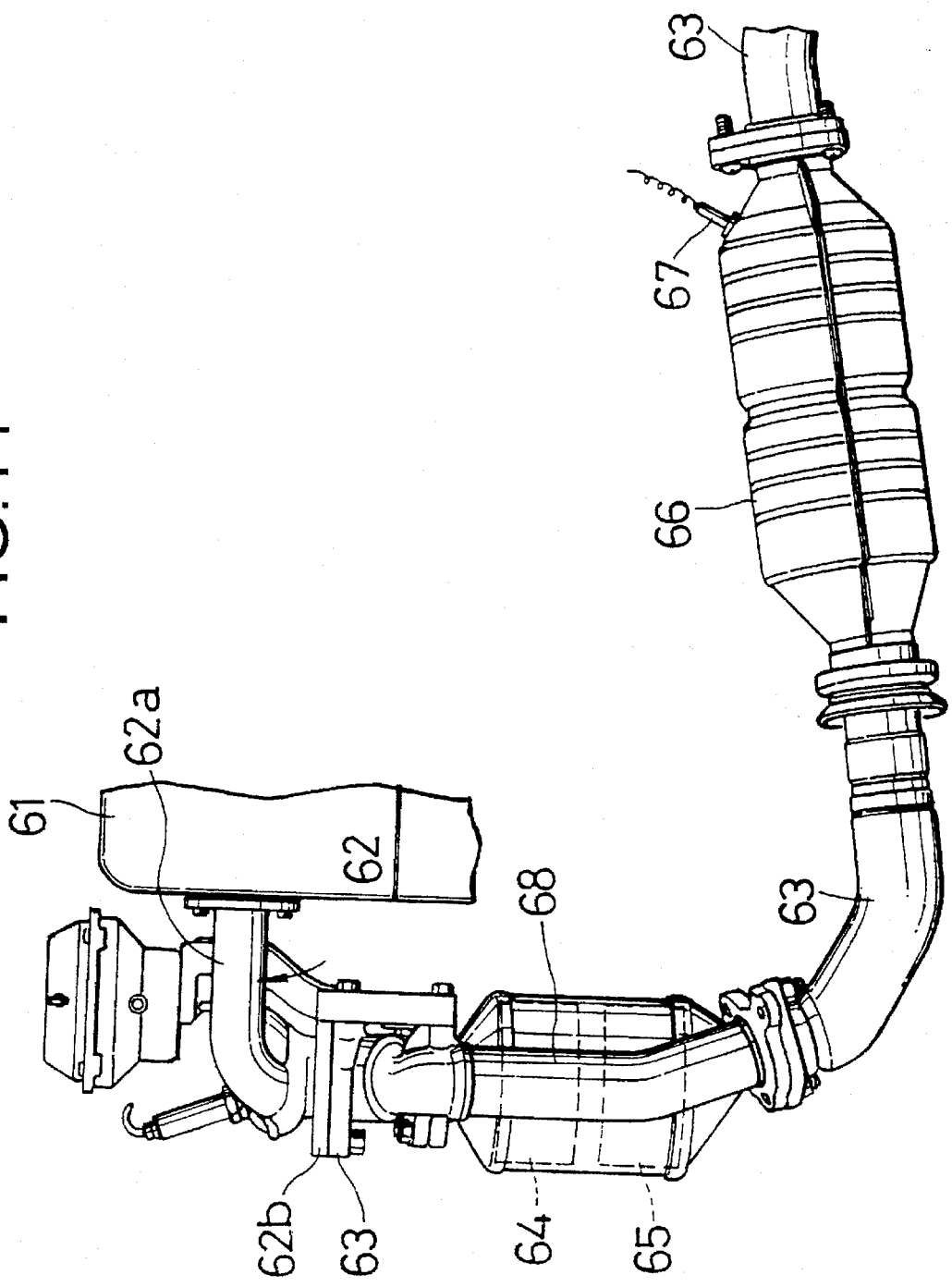
FIG. 14 is a side view of the essential portion shown in FIG. 13.

A third embodiment of the present invention will now be described with reference to FIGS. 13 and 14.

An exhaust manifold 62 is joined to a front surface of a cylinder head 61 of a multi-cylinder engine E for a vehicle and has a branch pipe 62a connected to an exhaust port in each of cylinders. An adsorbing trap 64, a first catalytic converter 65, a second catalytic converter 66 and a muffler (not shown) are provided in sequence from an upstream side in an exhaust pipe 63 connected to an aggregated pipe 62b of the exhaust manifold 62. A temperature sensor 67 is mounted on the second catalytic converter 66 for detecting the temperature of the second catalytic converter 66.

The temperature sensor 67 is a means for judging an unactivated or activated state of the second catalytic converter 66. If the temperature T of the catalytic converter 66 is equal to an unactivating temperature (lower than 300° C.), the temperature sensor 67 generates a signal indicative of this fact. If the temperature T of the catalytic converter 66 is equal to or higher than 300° C., the temperature sensor 67 generates a signal indicative of that fact.

The adsorbing trap 64 includes a hydrocarbon (HC) adsorbent which adsorbs hydrocarbons at a low temperature (lower than 140° C.) and desorbs the hydrocarbons at a high temperature (equal to or higher than 140° C.), as does the above-described adsorbing trap 15.

Each of the first and second catalytic converters 65 and 66 has a noble metal catalyst which is activated at a predetermined temperature (300° C. or more) to convert hydrocarbons (HCs) carbon monoxide (CO) and nitrogen oxides (NOx) in an exhaust gas into harmless substances. The first catalytic converter 65 is disposed in close proximity to the engine E, and the second catalytic converter 66 is disposed below a floor of the vehicle.

A bypass pipe 68 is connected to the exhaust pipe 63 to bypass the adsorbing trap 64 and the first catalytic converter 65, and a switch-over valve 69 is mounted in a connection between an upstream end of the bypass pipe and the exhaust pipe 63. The switch-over valve 69 is operable between a first position "A", see 69(A), in which it blocks the bypass pipe 68 and a second position "B", see 69(B) in which it permits the communication of the bypass pipe 68 and closes the inlet of the adsorbing trap 64.

The first catalytic converter 65 is provided with an electric heater 70 for heating the same. A main switch 73 and a control switch 74 are inserted in series into an energizing circuit 72 which connects the electric heater 70 and a power source 71 to each other. The main switch 73 is opened and closed in operative association with an ignition switch for the engine E.

The control switch 74 and the switch-over valve 69 are controlled as given in the following Table 5 by an output signal from the temperature sensor 67, i.e., in accordance with the temperature T of the second catalytic converter 66.

TABLE 5

| Output signal from temperature sensor 67 | T < 300° C. | T ≧ 300° C. |
|---|---|---|
| State of control switch 74 | closed | opened |
| Position of switch-over valve 69 | A | B |

The operation of the third embodiment now will be described. When the second catalytic converter 66 is in an unactivated state immediately after the start of the engine E, the temperature sensor 67 delivers a signal indicative of T<300° C. and hence, the control switch 74 is maintained at a closed state to energize the electric heater 70 by cooperation with the main switch 73, thereby heating the first catalytic converter 65. The switch-over valve 69 is retained at the first position A to block the bypass pipe 68. Therefore, the exhaust gas discharged from the engine through the exhaust manifold 62 into the exhaust pipe 63 passes in sequence through the adsorbing trap 64, the first catalytic converter 65.and the second catalytic converter 66 before being released to atmosphere through the muffler.

During this time, hydrocarbons in the exhaust gas passing through the adsorbing trap 64 are adsorbed into the hydrocarbon adsorbent in the adsorbing trap 64. The first catalytic converter 65 is heated more rapidly than the second catalytic converter 66 by the electric heater 70 and the heat of the exhaust gas, so that it is activated relatively early. When the first catalytic converter 65 becomes activated, it converts harmful components such as hydrocarbons, carbon monoxide (CO) and nitrogen oxides (NOx) in the exhaust gas passing through the first catalytic converter 65 into harmless substances. At the time when the first catalytic converter 65 is activated in this manner, the adsorbing trap 64 reaches a hydrocarbon desorbing temperature (equal to or higher than 140° C.) under the heat of the exhaust gas, so that hydrocarbons desorbed from the adsorbing trap 64 are also converted into harmless substances in the first catalytic converter 65, and the absorbing trap 64 is regenerated.

If the second catalytic converter 66 disposed downstream is then activated by the heat of the exhaust gas, the temperature sensor 67 delivers a signal indicative of T≧300° C., so that the control switch 74 is opened to deenergize the electric heater 70, and the switch-over valve 69 is shifted to the second position B to permit the communication with the bypass pipe 68 and to close the inlet of the adsorbing trap 64. Thus, the exhaust gas exiting from the exhaust manifold 62 is now passed via the bypass pipe 68 into the second catalytic converter 66, where the exhaust gas is purified. Flow of the exhaust gas into the adsorbing trap 64 is inhibited and hence, an excessive increase in the temperature of the adsorbing trap 64 can be suppressed to insure the durability thereof. Additionally, a useless consumption of electric power by the electric heater 70 can be prevented by deenergization thereof.

In addition to hydrocarbons (unburned components), carbon monoxide (CO) is also contained in the exhaust gas from the engine E in each of the above-described embodiments and is adsorbed into the adsorbing trap 15, 64. For this reason, the following disadvantages arise.

Figure 20:
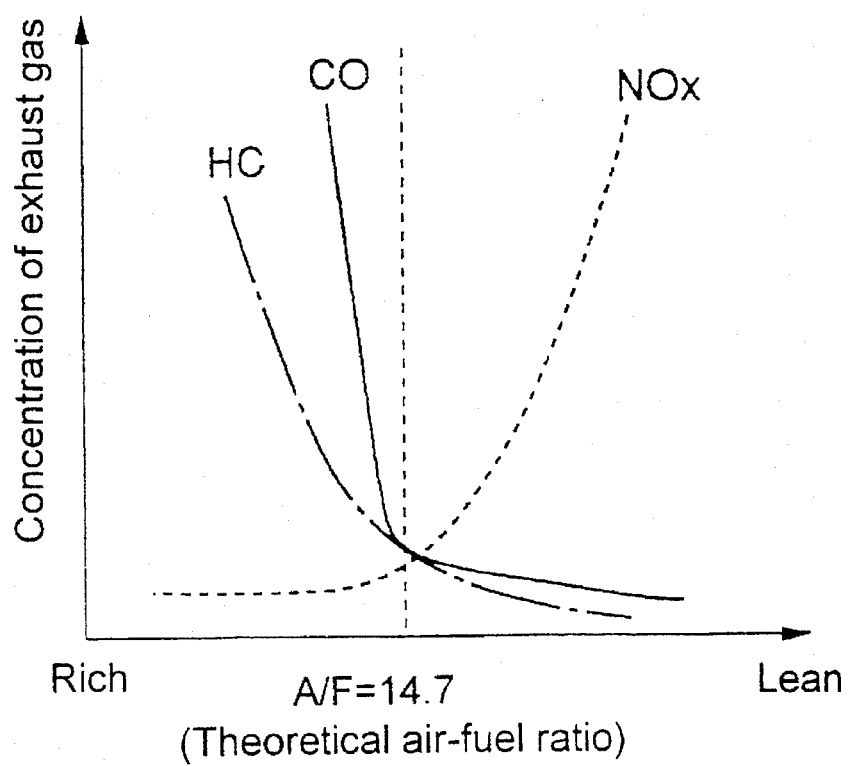
FIG. 20 is a diagram illustrating the relationship between the air-fuel ratio and the concentration of different gases in an exhaust gas.

If the air-fuel ratio of an air-fuel mixture supplied to the engine E is enriched more than an ideal theoretical air-fuel ratio (A/F=14.7), as shown in FIG. 20, the concentration of CO in the exhaust gas is rapidly increased and impedes the adsorption of hydrocarbons in the adsorbing trap. Therefore, if the air-fuel ratio is controlled to be enriched immediately after the start of the engine as in the prior art, the adsorption of the hydrocarbons in the adsorbing trap is insufficient. If a sufficient amount of hydrocarbons adsorbed is to be insured, an adsorbing trap having a large capacity normally is required.

The fourth embodiment, shown in FIGS. 15 to 19, of this invention has been accomplished in view of such points, in which a sufficient amount of hydrocarbons adsorbed can be insured without increasing the capacity of the adsorbing trap. The fourth embodiment now will be described in detail.

Figure 15:
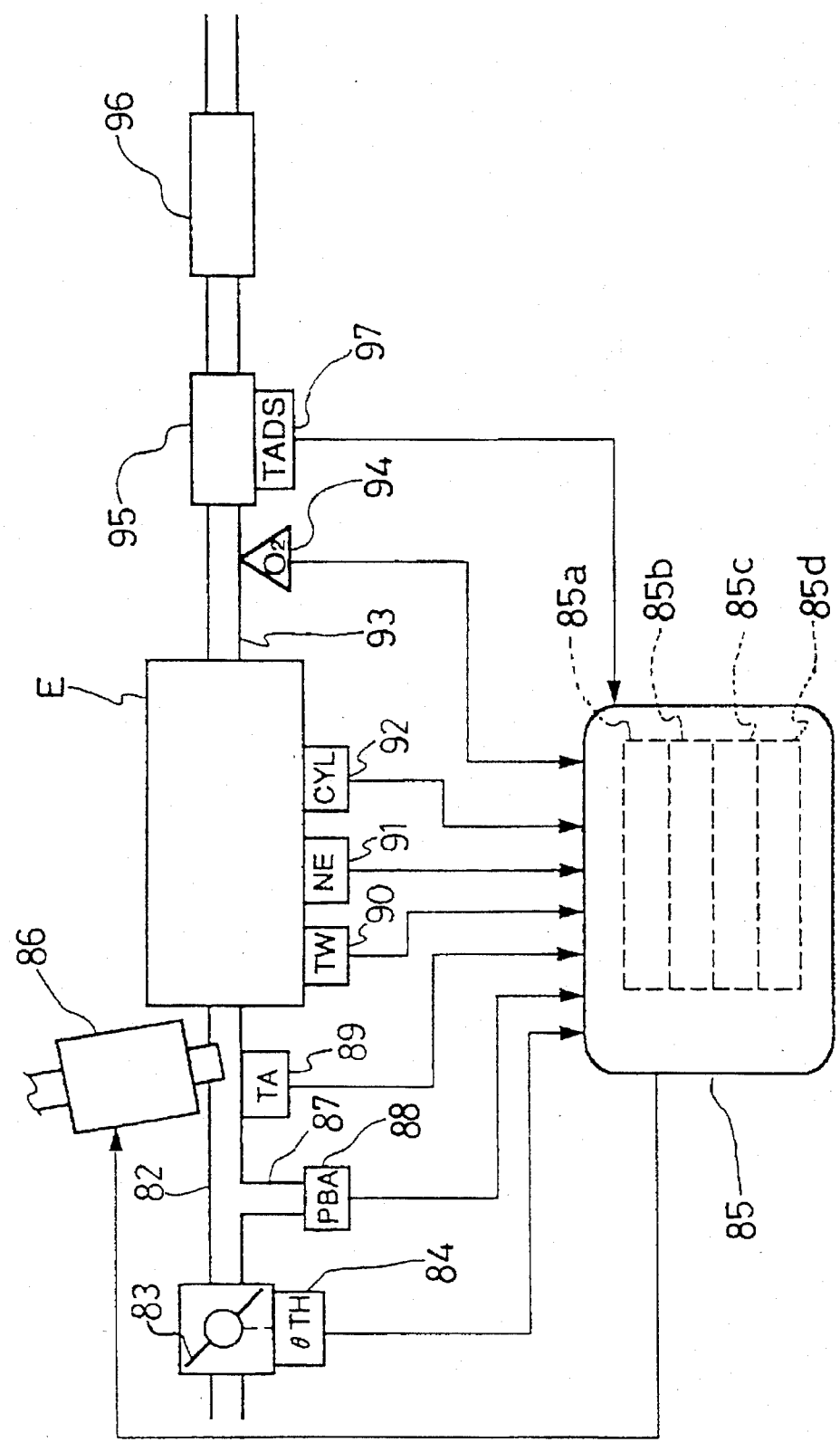
FIG. 15 is a diagram of the arrangement of an engine according to a fourth embodiment of the present invention and a control unit therefor.

FIG. 15 is an illustration of the entire arrangement of an engine and a control system therefor. A throttle valve 83 is disposed in an intake pipe 82 of the engine E. A throttle valve opening degree (θ TH) sensor 84 is connected to the throttle valve 83 and delivers an electric signal corresponding to an opening degree of the throttle valve 83 to an electronic control unit (which will be referred to as "ECU" hereinafter) 85.

A fuel injection valve 86 is mounted for every cylinder between the engine E and the throttle valve 83 in an intake pipe 82 slightly upstream of an intake valve (not shown). The injection valves are connected to a fuel pump (now shown) and electrically connected to ECU 85, so that the valve-opening time for injection of the fuel is controlled in response to a signal from the ECU 85.

An intake pipe engine absolute pressure (PBA) sensor 88 is mounted immediately downstream from the throttle valve 83 through a pipe 87 to supply an absolute pressure signal converted into an electric signal to the ECU 85. An intake gas temperature (TA) sensor 89 is mounted downstream from the absolute pressure sensor 88 for detecting the intake gas temperature TA to deliver a corresponding electric signal to the ECU 85.

An engine water temperature (TW) sensor 90 is mounted in the body of the engine E and is comprised of a thermistor or the like for detecting the temperature of engine water (temperature of the cooling water) TW to deliver a corresponding temperature signal to the ECU 85. An engine revolution-number (NE) sensor 91 and a cylinder judgment (CYL) sensor 92 are mounted adjacent a periphery of a cam shaft or a crankshaft (both not shown) of the engine E. The engine revolution-number (NE) sensor 91 delivers a pulse (which will be referred to as "TDC signal pulse" hereinafter) at a predetermined crank angle position upon a rotation of the crankshaft of the engine E through every 180°, and the cylinder judgment sensor 92 delivers a signal pulse at a Predetermined crank angle position of a Particular cylinder. These signal pulses are supplied to the ECU 85.

Mounted in an exhaust passage 93 of the engine E in sequence from an upstream side thereof are an oxygen concentration sensor 94 (which will be referred to as "$O_2$ sensor 94" hereinafter) as an air-fuel ratio sensor, an adsorbing trap 95 for adsorbing unburned components (hydrocarbons) in an exhaust gas, and a catalytic converter 96 similar to the above-described catalytic converter 16 for converting hydrocarbons (HCs), carbon monoxide (CO) and nitrogen oxides (NOx) in the exhaust gas. The $O_2$ sensor 94 detects the concentration of oxygen in the exhaust gas and sends an electric signal corresponding to such a detection value to the ECU 85.

The adsorbing trap 95 includes an adsorbent such as zoolite, mordenite, aluminosilicate, activated carbon and the like that adsorbs unburned components at a temperature equal to or lower than about 140° C., but desorbs (purges) the adsorbed components at a temperature exceeding 140° C., as does the above-described adsorbing trap 15. The adsorbing trap 95 is provided with a temperature sensor 97 for detecting the temperature TADS of the adsorbing trap 95. A detection signal is supplied to the ECU 85.

The ECU 85 includes an input circuit 85a having functions to shape the waveform of the input signal from each of the sensors, to correct the electric current to a predetermined level, to convert an analog signal value to a digital signal value and so on, a central processing unit (which will be referred to as "CPU" hereinafter) 85b, a memory means 85c for storing various processing programs carried out in the CPU 85b, results of processing and the like, an output circuit 85d for supplying a driving signal to the fuel injection valve 86, and the like.

The CPU 85b judges various engine operational states such as a feedback control operating range, an open-loop control operating range and the like depending upon the concentration of oxygen in the exhaust gas on the basis of the above-described various engine parameter signals, and arithmetically processes a fuel injection time Tout of the fuel injection valve 86 synchronous with the TDC signal pulse in accordance with the engine operational state according to a following expression (1):

$$Tout = Ti \times KO2 \times KLA \times K1 \times K2 \qquad (1)$$

wherein Ti is a valve related to the basic amount of fuel injected, particularly a basic fuel injection time determined depending upon a number NE of revolutions of the engine and an absolute pressure PBA within the intake pipe. A Ti map is previously stored in the memory means 85c in order to determine the Ti value.

KO2 is an air-fuel ratio correcting factor calculated on the basis of an output from the $O_2$ sensor 94, which is set so that an air-fuel ratio (concentration of oxygen) detected by the $O_2$ sensor 94 is equal to a target air-fuel ratio during an air-fuel ratio feedback control, and which is set at a predetermined value depending upon the operational state of the engine during an open-loop control.

KLA is a lean correcting factor for controlling the air-fuel ratio at a value leaner than the theoretical air-fuel ratio, which is set at a value smaller than 1.0 during a period in which the adsorption is carried out in the adsorbing trap 95.

K1 and K2 are other correcting factors and correcting variables calculated in accordance with the various engine parameter signals, respectively, each of which is set at a value to optimize characteristics such as a specific fuel consumption characteristic depending upon the operational state of the engine, an engine accelerating characteristic and the like.

The CPU 85b delivers a signal indicative of a command to drive the fuel injection valve 86, through the output circuit 85d, on the basis of results obtained by the calculations carried out in the above manner.

The ECU 85 includes an adsorbing period judging means and an air-fuel ratio control means.

Figure 16A:
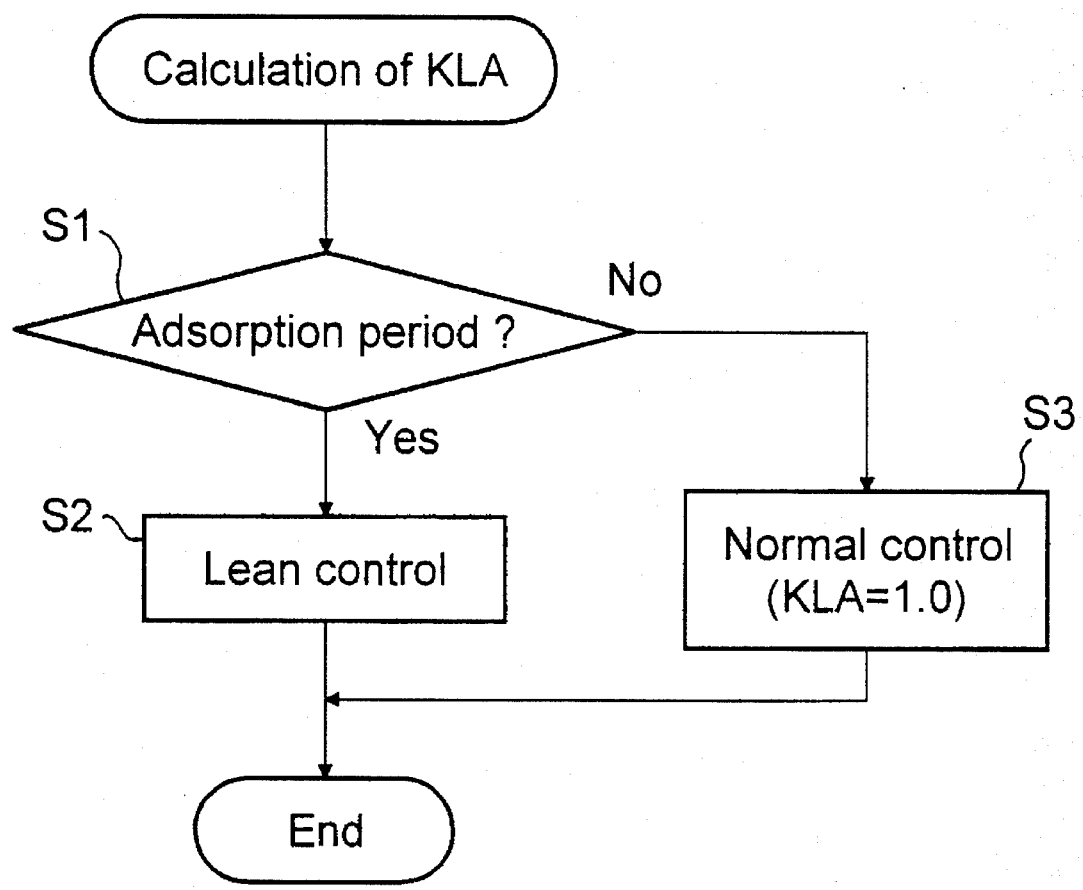
FIGS. 16A and 16B comprise a flow chart of a program for calculating a correcting factor (KLA) for the fuel injection time in the engine.

FIG. 16A is a flow chart of a program for calculating the correcting factor KLA. This program is carried out upon every generation of the TDC signal pulse and synchronously with such generation.

At a step S1 in FIG. 16A, it is judged whether or not the current state is during an adsorbing period, i.e., during a period in which the adsorbing trap 95 is in a state capable of adsorbing hydrocarbons, as described below. If NO, the KLA is set at 1.0 (non-correcting value) at a step S3. On the other hand, if YES, a lean control for the air-fuel ratio is carried out at a step S2.

Figure 16B:
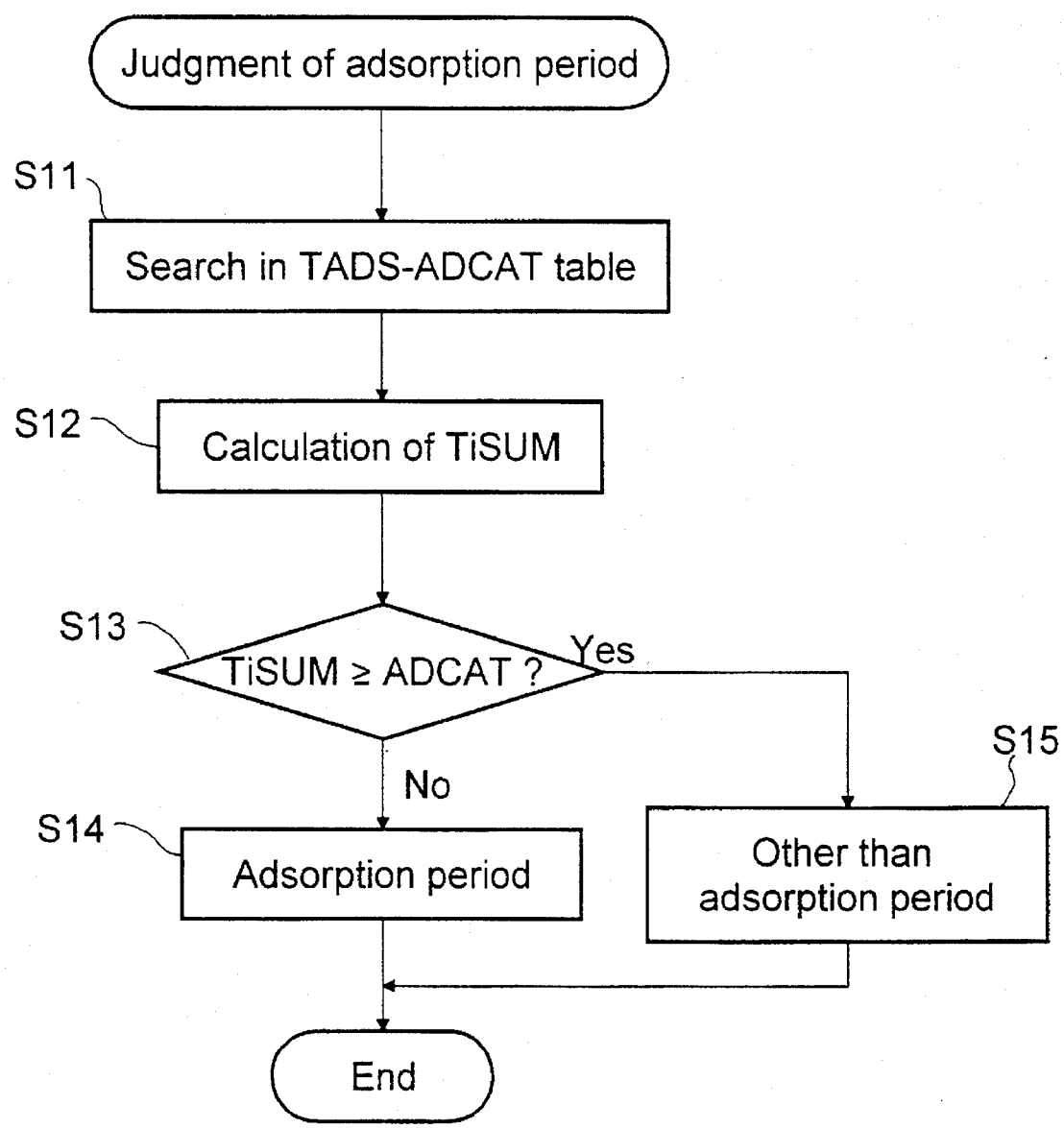
Figure 17:
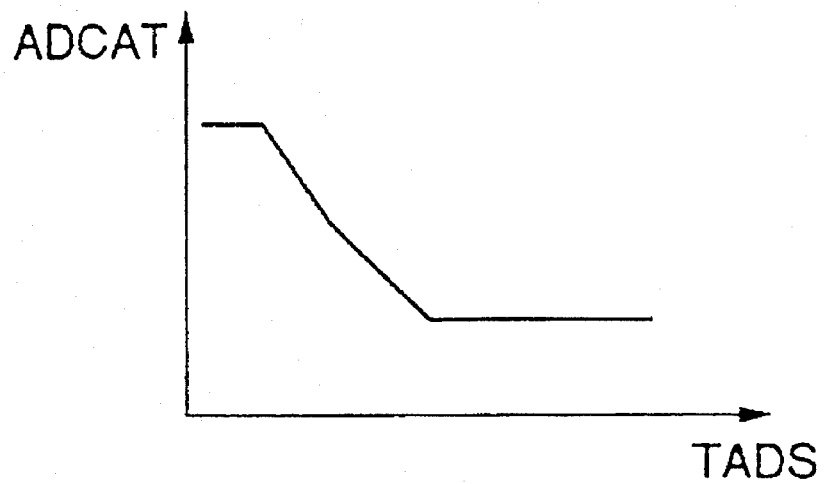
FIG. 17 is a diagram illustrating the relationship between the temperature (TADS) of an adsorbent in an adsorbing trap and the adsorption amount (ADCAT)

FIG. 16B is a flow chart illustrating a processing at the step S1 in detail. At a step S11 in FIG. 16B, a search in a TADS-ADCAT table, such as the table of FIG. 17, is carried out. In this table, the adsorbable amount of hydrocarbons (which will be referred to as "adsorption amount" hereinafter) ADCAT is established in accordance with the temperature TADS of the adsorbent within the adsorbing trap 95. At this step, the adsorption amount ADCAT is searched on the basis of the detected TADS value.

At a step S12, a TiSUM value (which will be referred to as "Ti integrated value" hereinafter) resulting from conversion of an integrated value of a basic fuel injection time Ti from a start point to a current point into an amount of hydrocarbon components is calculated.

Then, it is judged whether or not the TiSUM value is equal to or more than the adsorption amount ADCAT at a step D13) If TiSUM<ADCAT, it is decided that the adsorbing trap 95 is still in the adsorbable state, i.e., the current state is during the adsorption period, at step S14. On the other hand, if TiSUM≧ADCAT is established, it is decided at a step S15 that the current state is not during the adsorption period, i.e., the adsorbing trap 95 is in a state incapable of further adsorbing hydrocarbons, because the TiSUM value of hydrocarbons supplied is equal to or more than the maximum adsorption amount ADCAT.

Figure 18:
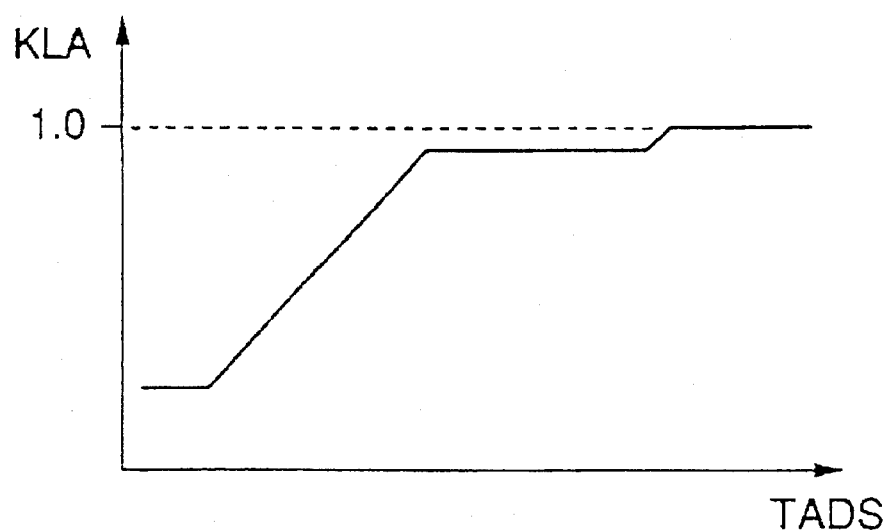
FIG. 18 is a diagram illustrating the relationship between the temperature (TADS) of the adsorbent and the correcting factor (KLA)

The contents of the lean control at the step S2 in FIG. 16A will be described with reference to FIG. 18.

The lean control is carried out by setting the correcting factor KLA at a value smaller than 1.0. The KLA is set, for example, in accordance with the temperature TADS of the adsorbent, as shown in FIG. 18.

Alternatively, the KLA value may be set in accordance with a lapsed time t after the start of the engine or in accordance with the Ti integrated value TiSUM. In such cases, use is made of a table with the lapsed time t or the Ti integrated value TiSUM taken on the axis of abscissas.

Figure 19:
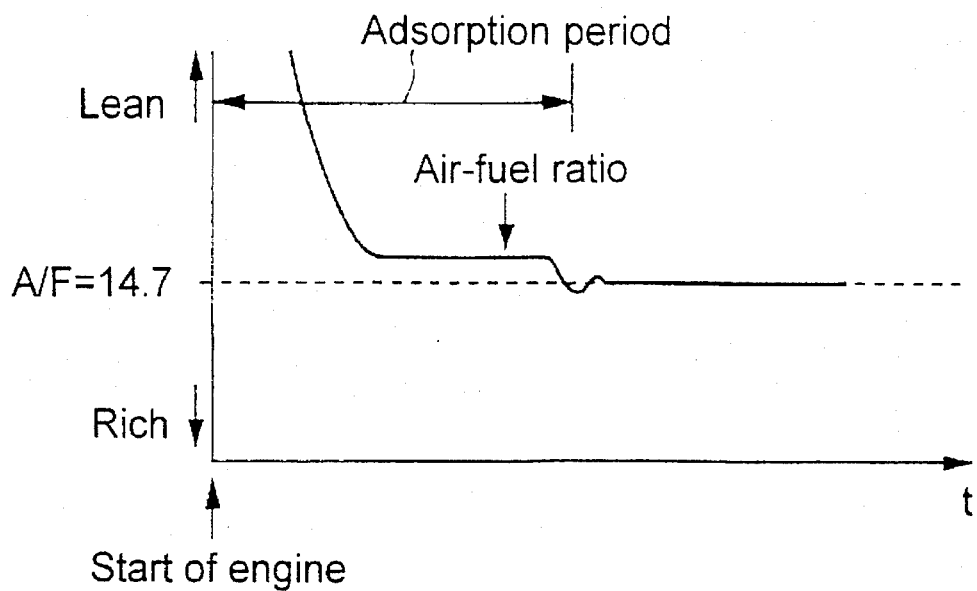
FIG. 19 is a diagram illustrating the change in air-fuel ratio of an air-fuel mixture supplied to the engine.

According to this embodiment, the air-fuel ratio of an air-fuel mixture supplied to the engine is varied, for example, as shown in FIG. 19, and controlled to a leaner value than A/F=14.7 during the adsorption period and to A/F=14.7, i.e., to the theoretical air-fuel ratio after completion of the adsorption period.

Thus, it is possible to prevent the hydrocarbon adsorbing capability of the adsorbing trap 95 from being reduced due to an increase in the amount of carbon monoxide (CO) adsorbed during the adsorption period. As a result, a required amount of hydrocarbon adsorbed can be insured without increasing of the capacity of the adsorbing trap 95.

Alternatively, after completion of the adsorption period, the air-fuel ratio may be controlled to a leaner value than the theoretical air-fuel ratio.

In addition, the method for judging the adsorption period is not limited to that shown in FIG. 16B, and for example, either a period from the start of the engine to a point at which the temperature TADS of the adsorbent reaches a predetermined temperature or a period from the start point of the engine to a point at which a predetermined time set in accordance with the engine water temperature TW has lapsed, may be judged as the adsorption period.

The lean control method is not limited to that described above, and for example, using a linear type sensor capable of linearly detecting the air-fuel ratio as the $O_2$ sensor, the air-fuel ratio may be feedbackcontrolled by varying the target air-fuel ratio as shown in FIG. 19, so that the target air-fuel ratio is matched to the detected air-fuel ratio.

Further, the adsorbing trap 95 may include a noble metal catalyst further carried therein, so that it also functions to purify the exhaust gas at a predetermined temperature or more. In this case, the adsorbing trap 95 may be disposed immediately downstream from a collected location where the exhaust pipes from the cylinders are collected.

What is claimed is:

1. An exhaust emission control system of an internal combustion engine including first and second exhaust ports provided in each combustion chamber of the engine and opened at inner ends into the combustion chamber, and first and second exhaust valves with operating devices for independently opening and closing or resting the first and second exhaust ports, said system comprising:.

a first exhaust manifold having a branch pipe connected to an outer end of the first exhaust port of each of the combustion chambers;

a second exhaust manifold having a branch pipe connected to an outer end of the second exhaust port of each of the combustion chambers; said first and second exhaust manifolds each having aggregated pipes, respectively, which are connected to a common exhaust pipe;

an adsorbing trap incorporated in said aggregated pipe of said first exhaust manifold for adsorbing hydrocarbons at a low temperature;

a catalytic converter incorporated in said common exhaust pipe; and control means for controlling the valve operating devices so that when the adsorbing trap is at a low temperature, each said first exhaust valve is operated to open and close and each said second exhaust valve is rested, thereby permitting exhaust gas from each of the combustion chambers to flow into the first exhaust manifold and then into said adsorbing trap.

2. An exhaust emission control system of an engine according to claim 1, wherein when said catalytic converter is at a high temperature, each said first exhaust valve is rested and each said second exhaust valve is operated, thereby permitting the exhaust gas from each of the combustion chambers to flow into said second exhaust manifold and then into said catalytic converter.

3. An exhaust emission control system of an engine according to claim 1, including a communication pipe provided between said first and second exhaust manifolds to permit said aggregated pipes of said first and second exhaust manifolds to communicate with each other upstream of said adsorbing trap; and a switch-over valve provided between the communication pipe and said first exhaust manifold and switchable by said control means between a first position in which said switch-over valve blocks the communication pipe and a second position in which said switch-over valve blocks the aggregated pipe of the first exhaust manifold at a location adjacent an inlet of said adsorbing trap, so that when the adsorbing trap is at a low temperature, each said first exhaust valve is operated and each said second exhaust valve is rested, and said switch-over valve is shifted to said first position, and when the catalytic converter is at a high temperature, both said first and second exhaust valves are operated, and said switch-over valve is shifted to said second position.

4. An exhaust emission control system of an engine according to any of claims 1 to 3, wherein said adsorbing trap is provided in an intermediate portion of an exhaust passage, and said system further includes an adsorption period judging means for judging an adsorption period during which said adsorbing trap can adsorb hydrocarbons, and an air-fuel ratio control means for controlling an air-fuel ratio of an air-fuel mixture supplied to the engine to a value leaner than a theoretical air-fuel ratio during a period of adsorption by said adsorbing trap, and controlling the air-fuel ratio to a value richer in fuel than the leaner air-fuel ratio after completion of said adsorption period.

5. An exhaust system according to claim 4 wherein said adsorbtion period judging means comprises means for determining the temperature of said adsorbing trap.

6. An exhaust system according to claim 4 wherein said adsorbtion period judging means comprises means for determining an amount of fuel used by the engine following starting of the engine and comparing said amount of fuel with a hydrocarbon adsorbing capacity of said adsorbing tray.

7. An exhaust system according to claim 4 wherein said adsorbtion period judging means comprises means for determining the temperature of the engine.

8. An exhaust system according to claim 4 wherein said adsorbtion period judging means comprises means for determining the period of time that has passed following the start of the engine.

9. An exhaust emission control system of, an internal combustion engine, comprising: an adsorbing trap for adsorbing hydrocarbons in exhaust gas from the engine below a predetermined temperature and desorbing the hydrocarbons above said predetermined temperature; a first catalytic converter located downstream from said adsorbing trap and activated at a temperature higher than said predetermined temperature; an adsorption period judging means for judging an adsorption period during which said adsorbing trap can adsorb hydrocarbons, and an air-fuel ratio control means for controlling an air-fuel ratio of an air-fuel mixture supplied to the engine to a value leaner than a theoretically ideal air-fuel ratio during a period of adsorption by said adsorbing trap and controlling the air-fuel ratio to a value richer in fuel than the leaner air-fuel ratio after completion of said adsorption period.

10. An exhaust system according to claim 9 wherein said adsorbtion period judging means comprises means for determining the temperature of said adsorbing trap.

11. An exhaust system according to claim 9 wherein said adsorbtion period judging means comprises means for determining an amount of fuel used by the engine following starting of the engine and comparing said amount of fuel with a hydrocarbon adsorbing capacity of said adsorbing tray.

12. An exhaust system according to claim 9 wherein said adsorbtion period judging means comprises means for determining the temperature of the engine.

13. An exhaust system according to claim 9 wherein said adsorbtion period judging means comprises means for determining the period of time that has passed following the start of the engine.

* * * * *